United States Patent [19]
Gordon

[11] Patent Number: 4,779,716
[45] Date of Patent: Oct. 25, 1988

[54] CONVEYOR BELT CLEANER

[75] Inventor: James R. Gordon, Benton, Ill.

[73] Assignee: Gordon Balt Scrapers, Inc., Benton, Ill.

[21] Appl. No.: 899,417

[22] Filed: Aug. 22, 1986

[51] Int. Cl.$^4$ ............................................... B65G 45/00
[52] U.S. Cl. ..................................... 198/497; 15/256.5
[58] Field of Search ................................ 198/497–499; 15/256.5, 256.51–256.53, 256.6

[56] References Cited

U.S. PATENT DOCUMENTS

| | | | |
|---|---|---|---|
| 3,674,131 | 7/1972 | Matson | 198/497 |
| 4,105,109 | 8/1978 | Schultz | 198/499 |
| 4,359,150 | 11/1982 | Bowman et al. | 198/497 |
| 4,529,084 | 7/1985 | Zhang | 198/499 |
| 4,533,036 | 8/1985 | Gordon | 198/499 |
| 4,598,823 | 7/1986 | Swinderman | 198/497 |
| 4,633,999 | 1/1987 | Perneczky | 198/499 |

FOREIGN PATENT DOCUMENTS

| | | | |
|---|---|---|---|
| 0004809 | 10/1979 | European Pat. Off. | 198/497 |
| 2709714 | 9/1978 | Fed. Rep. of Germany | 198/497 |
| 2081662 | 2/1982 | United Kingdom | 198/498 |

Primary Examiner—Robert J. Spar
Assistant Examiner—Lyle Kimms
Attorney, Agent, or Firm—Kinzer, Plyer, Dorn, McEachran & Jambor

[57] ABSTRACT

A conveyor belt cleaner including an elongated mounting member extending across but spaced from the conveyor belt comprises a plurality of support arm anchors affixed to the mounting member at spaced intervals along its length and a corresponding plurality of molded, resilient resin cleaner blade support arms each mounted on an anchor member in a keyed interference fit. There are a corresponding plurality of molded, resilient resin cleaner blade units, each mounted on the outer end of one of the blade support arms, again with a keyed interference fit between each blade unit and its support arm.

19 Claims, 2 Drawing Sheets

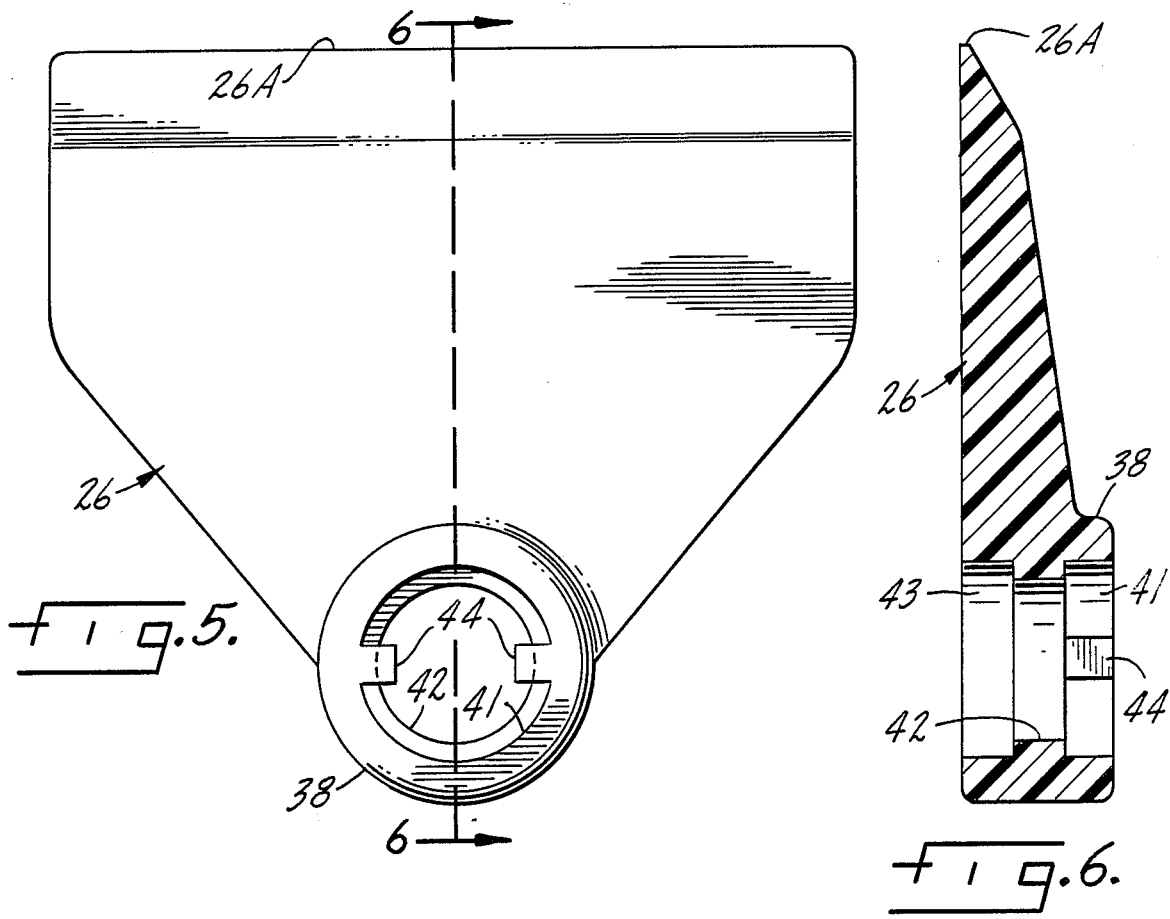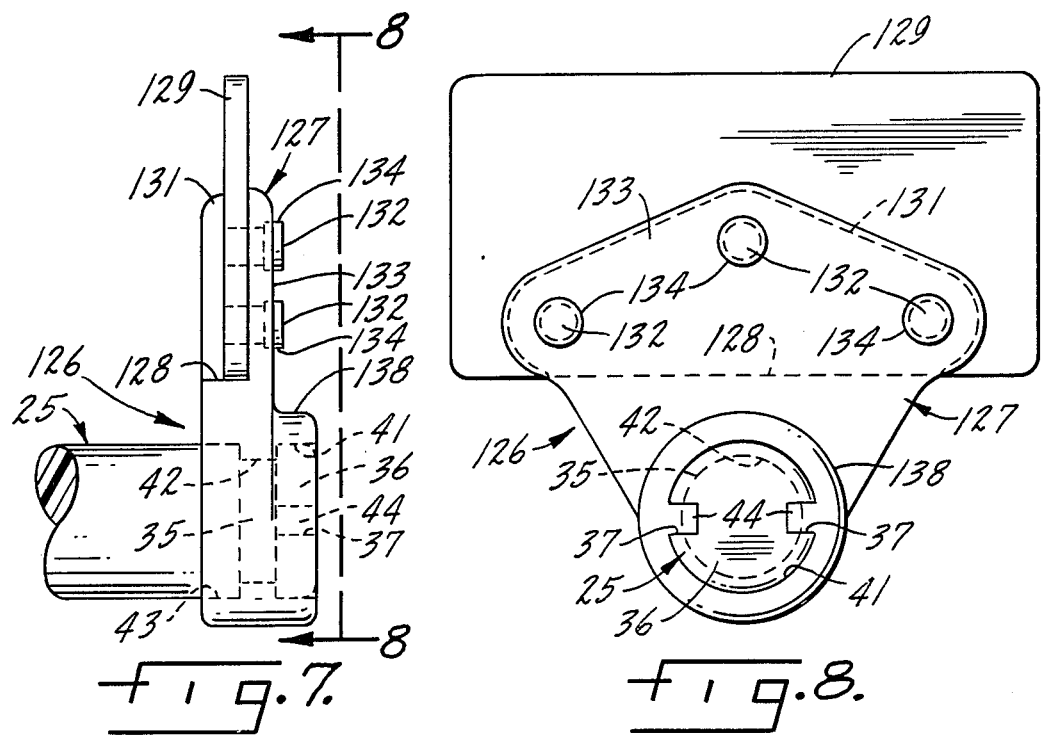

CONVEYOR BELT CLEANER

BACKGROUND OF THE INVENTION

Blade type cleaners are frequently provided for the belt conveyors utilized in mining and mineral storage operations and other such applications; such a device clears the conveyor belt of material that adheres to its surface. These conveyor belt cleaners usually operate in an environment that can only be described as hostile. The working conditions are frequently wet, dirty, and even corrosive. Continuing maintenance activity is a necessity due to inevitable wear on the cleaner blades, but is often rendered difficult by limited access space and the aforementioned adverse working conditions. In excessively wet or corrosive environments, maintenance is made more difficult by corrosion of metal mounting bolts, clamps, and the like. All of these difficulties are likely to be present in mining operations and also in industrial applications.

A conveyor cleaner is also likely to encounter substantial problems from shock forces applied to the cleaner blades. Large pieces of the conveyed material or debris adhering to the conveyor belt, when engaged by a cleaner blade, may damage the blade or its support. The cleaner blades are also subject to impact by engagement with the joints between individual segments of the conveyor belt. Repeated shocks and impacts of this kind may lead to shutdown for repair or replacement of cleaner components, a time consuming and expensive procedure. Thus, it is important to minimize or avoid shock damage to the components of the conveyor belt cleaner as well as to compensate for the inevitable wear on cleaner blades due to continuing normal operation.

A highly effective and efficient conveyor belt cleaner utilizing torsion bias mechanism to maintain the cleaner blades in engagement with the conveyor belt is disclosed in U.S. Pat. No. 4,533,036 issued to James R. Gordon Aug. 6, 1985. Even that conveyor cleaner, however, has the disadvantage that replacement of the cleaner blade supports may require appreciable downtime because the blade supports are all keyed to the torsion biased shaft. Some of the blade support arms utilized in that system also have the disadvantage of being formed of metal, which may be undesirable in some excessively wet and corrosive environments. Thus, despite the generally excellent performance characteristics of that conveyor belt cleaner, some difficulties remain.

SUMMARY OF THE INVENTION

It is an object of the present invention, therefore, to provide a new and improved conveyor belt cleaner, suitable for use in mining and in heavy duty industrial applications, that permits rapid and convenient replacement of individual cleaner blades and individual cleaner blade support arms while still providing superior shock protection for the cleaner and for the conveyor belt and effectively compensating for wear on the cleaner blades. A related object of the invention is to provide for rapid replacement of individual cleaner blades and their support arms in a heavy duty conveyor belt cleaner that can be utilized at any desired location along a conveyor belt used in mining or industrial applications, utilizing blade units and support arms that are formed entirely as molded resilient resin components.

Accordingly, the invention relates to improvements in a conveyor belt cleaner of the kind comprising an elongated mounting member extending in transverse spaced relation to a conveyor belt, a plurality of resilient blade support arms mounted at spaced longitudinal positions on the mounting member and projecting from the mounting member toward the conveyor belt, and a plurality of cleaner blade units mounted on the outer ends of the blade support arms. The improvement comprises a plurality of support arm anchors affixed to the mounting member at longitudinally spaced intervals, each anchor including a key element, and a plurality of molded resilient resin blade support arms each having an inner end and an outer end, each end of each blade support arm including a key element. The inner end of each blade support arm has a predetermined configuration interfitting with one of the anchors in a keyed interference fit to afford a firm but displaceable mounting of the support arm on the anchor in a predetermined fixed orientation relative to the mounting member. A plurality of molded resilient resin cleaner blade units are provided, each unit including a mounting portion comprising a key element. The outer end of each blade support arm has a predetermined configuration interfitting with the mounting portion of one of the blade units in a keyed interference fit to afford a firm but displaceable mounting of the blade unit on the outer end of the support arm in a predetermined fixed orientation relative to the blade support arm.

BRIEF DESCRIPTION OF THE DRAWINGS

FIG. 5 is an end elevation view of one of the blades from the conveyor belt cleaner of FIG. 1;

FIG. 6 is a sectional view taken approximately as indicated by line 6—6 in FIG. 5;

FIG. 7 is a detail view illustrating an alternate type of blade unit that may be used with the blade support arm of FIG. 2; and FIG. 8 is an elevation view of the alternate blade unit taken approximately along line 8—8 in FIG. 7.

DESCRIPTION OF THE PREFERRED EMBODIMENTS

Figure 1:
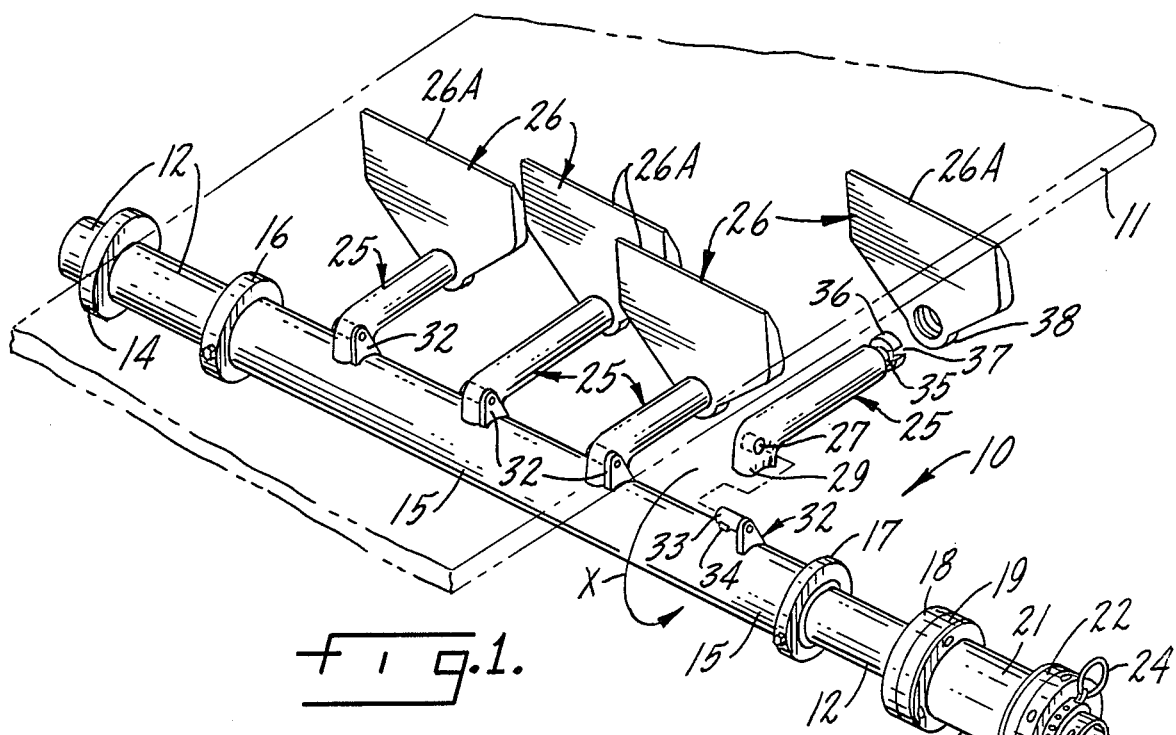
FIG. 1 is a simplified perspective view of a conveyor belt cleaner constructed in accordance with a preferred embodiment of the present invention.

FIG. 1 illustrates a conveyor belt cleaner 10 of the kind disclosed in greater detail in the aforementioned U.S. Pat. No. 4,533,036, to Gordon modified to incorporate the improved blade mounting system of the present invention. The conveyor belt cleaner 10 is shown associated with a moving conveyor belt 11. Belt cleaner 10 comprises an elongated shaft 12 that extends transversely of conveyor belt 11 in spaced relation to the surface of the belt. The left-hand end of shaft 12, as shown in FIG. 1, is journalled in a bearing 14 supported by a fixed frame (not shown). Inwardly from bearing 14, shaft 12 is affixed to an elongated sleeve or mounting member 15 by suitable means such a collar 16. A similar mounting collar 17 joins the other end of the tubular mounting member 15 to shaft 12. Shaft 12 may be formed into segments or may be continuous throughout the interior of sleeve 15.

The right-hand portion of shaft 12, FIG. 1, extends through another bearing 18 mounted on the fixed frame (not shown) that affords general support for conveyor cleaner 10. Bearing 18 is connected to a flange 19 on a torsion tube 21 that is part of a torsion bias mechanism 20. Another flange 22 on the outer end of torsion tube 21 is connected to a collar 23. Collar 23 is connectible to the outer end of shaft 12 through an angularly adjustable connection comprising a shear pin 24.

Conveyor belt cleaner 10 further comprises a plurality of resilient blade support arms 25. The blade support arms 25 are mounted at spaced longitudinal positions along the mounting member, sleeve 15, and all project from the mounting member, generally toward conveyor belt 11, in a predetermined fixed orientation. A corresponding plurality of cleaner blades 26 are included in belt cleaner 10, each blade 26 being mounted on the outer end of one of the blade support arms 25. Support arms 25 are all essentially identical in construction except that two different lengths are employed, alternately, so that the cleaner blades 26 are disposed in slightly overlapping alignment across the width of conveyor belt 11 to assure thorough cleaning of all of the belt surface.

As thus far described, conveyor belt cleaner 10 corresponds essentially to the construction disclosed in the aforementioned Gordon U.S. Pat. No. 4,533,036. In operation, the torsion bias mechanism 20 biases shaft 12 and support sleeve 15 toward rotation in the direction indicated by arrow X. As a consequence, the cleaning edges 26A of blades 26 are maintained in engagement with the surface of conveyor belt 11, cleaning adherring material and debris from the belt surface. Major shocks are taken up, to a substantial extent, by the torsion bias mechanism 20. Of course, the continuing bias afforded by that mechanism effectively compensates for gradual wear on the belt-engaging surfaces of cleaner blades 26. The improvement represented by the present invention pertains to the blade support arms 25, the mounting of blades 26 on those support arms, and of the blade support arms 25 on the transverse mounting member 15.

Figures 2, 3, 4:
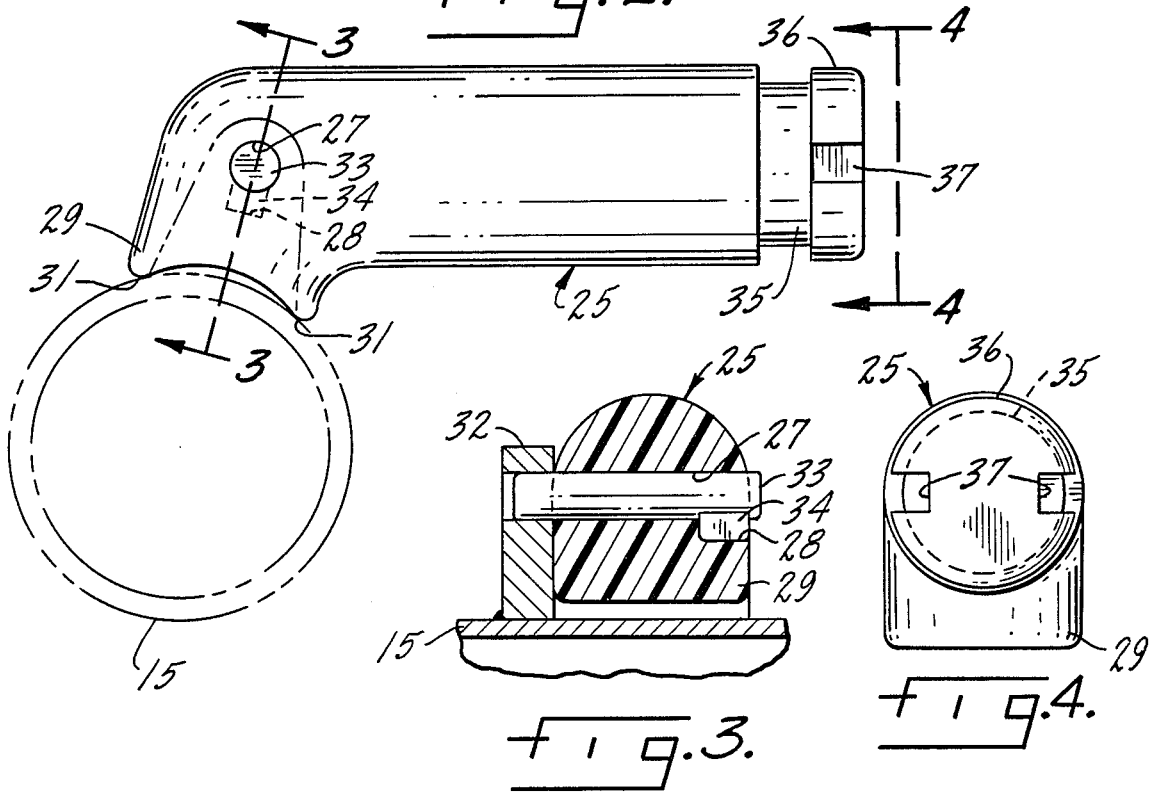
FIG. 2 is a side elevation view of one of the blade support arms for the conveyor cleaner of FIG. 1.
FIG. 3 is a detail sectional view taken approximately as indicated by line 3—3 in FIG. 2.
FIG. 4 is an end elevation view taken approximately as indicated by line 4—4 in FIG. 2.

FIGS. 2–4 illustrate one of the blade support arms 25 and the manner in which that arm 25 is mounted upon mounting member 15. The blade support arm 25 is of unitary molded resilient resin construction, incorporating no metal components. The preferred material for arm 25 is a relatively dense and heavy polyurethane.

The inner end of blade support arm 25, the end adjacent the mounting member afforded by shaft 15, includes a transverse aperture or socket 27, preferably extending entirely through the width of the arm. A keyway 28 is formed in one end of the aperture or socket 27. In the preferred construction, as illustrated, keyway 28 is substantially shorter than the associated socket 27. The inner end of arm 25 also includes an angular projection 29 which engages mounting member 15, as indicated at points 31, to aid in maintaining the orientation of arm 25 relative to mounting member 15.

Blade support arm 25 is mounted on an anchor 32 that is welded or otherwise affixed to mounting member 15. Anchor 32 is simply a small metal lug from which a pin 33 projects, pin 33 being aligned with the axis of the tubular mounting member 15 (see FIG. 1). Anchor 32 further includes a short key 34. The dimensions of pin 33 and key 34 are such that they fit tightly into socket 27 and keyway 28 in the inner end of blade support arm 25. That is, the external dimensions of pin 33 and key 34 should be at least equal to and may be even very slightly larger than the internal dimensions of socket 27 and keyway 28, so that a firm interference fit between arm 25 and anchor 32 is assured.

The outer end of blade support arm 25, FIGS. 2 and 4, comprises a radially inwardly extending groove 35 immediately adjacent to a radially outwardly projecting flange 36. Preferably, the outer diameter of flange 36 is slightly smaller than the diameter of the central portion of arm 25. There are two diametrically opposed radially inwardly extending keyways 37 in flange 36.

The construction of a typical cleaner blade 26 is shown in FIGS. 5 and 6. Blade 26 is of unitary molded construction, preferably formed of a moderately resilient resin. The preferred material for blade 26 is the same as for support arm 25, a dense polyurethane.

Blade 26 includes hub 38 from which the main portion of the blade flares upwardly and outwardly as shown in FIG. 5. Proceeding inwardly from the outer right-hand surface of hub 38, as shown in FIG. 6, the hub includes an outer annular groove 41, an inwardly projecting rib or flange 42, and an inner groove 43. Groove 41 should have an inside diameter that is no greater than the outer diameter of flange 36 on arm 25; the inside diameter of groove 41 may be made very slightly smaller than the outer diameter of flange 36 to assure a firm interference fit. The inside diameter of flange 42 in the hub 38 of blade 26 should be approximately equal to or very slightly smaller than the outer diameter of groove 35 in the outer end of arm 25. The recess or groove 43 in the hub of blade 26 should be large enough to accommodate the end of arm 25 immediately adjacent its groove 35. These dimensional relationships are selected so that blade 26 may be mounted on the outer end of arm 25 only by the application of substantial force. That is, a tight press fit is used.

The outer groove or recess 41 in the hub of blade 26 has two molded integral keys 44 projecting radially inwardly. When blade 26 is mounted on the outer end of its support arm 25, each of the keys 44 engages in one of the keyways 37 formed in flange 36 at the outer end of the support arm. Thus, in addition to a tight force fit, the key construction provided by the invention assures retention of blade 26 in predetermined fixed angular orientation on the outer end of arm 25.

When the elements of conveyor belt cleaner 10 are assembled as shown in FIG. 1, each of the support arms 25 is mounted on one of the anchors 32. This is accomplished by aligning the socket 27 in each support arm with the pin 33 of its anchor 32 and then forcing the support arm socket over the anchor pin, usually with a sharp blow from a mallet or a hammer. Similarly, to mount one of the blades 26 on its support arm 25, the hub and socket portion 38 of the blade is aligned with the outer end of the support arm, taking care to have the keys and keyways 37 and 44 aligned, and the blade is then forced onto the support arm. From the previous description of the dimensions entailed, it will be apparent that it is again necessary to apply substantial force and one or more blows from a mallet or hammer may be utilized for this purpose. It will also be apparent that some compression of the outer rib 36 on the support arm is necessary, when mounting each blade 26 on its arm 25, in order to move flange 36 through rib 42. This is the reason that both the blade and the support arm should be molded of a somewhat resilient resin material. When all of the blades 26 are mounted on support arms 25 and all of the support arms are mounted on anchors 32, each support arm is firmly but displaceably mounted on its anchor 32 in a predetermined fixed orientation relative to mounting member 15 and each blade 26 is firmly but displaceably mounted on its arm 25 in a predetermined fixed orientation relative to the support arm.

In the event that one of the blades 26 is damaged during operation of cleaner 10, it is a simple matter to remove the blade and its support arm by dislodging the support arm from its anchor 32, usually by a single blow of a mallet or hammer. The damaged blade can then be removed from the support arm, a new blade mounted in place and the support arm again forced back onto its anchor. Complete removal and replacement of a damaged blade or support arm, when necessary, can be accomplished in a matter of minutes.

The resilient construction of arms 25 absorbs many of the impact forces applied to blades 26 by debris and material clinging to belt 11 and by the mechanical joints in belt 11. As compared with previously known metal supports, the molded resilient support arms 25 can be expected to provide an extended service life under highly adverse conditions. For major maintenance, entailing replacement of all of blades 26, a complete changeover can be carried out most expeditiously, with minimum down-time for conveyor 11.

As previously mentioned, and as best shown in FIG. 4, rib 36 at the outer end of each blade support arm 25 is preferably somewhat smaller in diameter than the main body of the blade support arm. This relationship assures mounting of each of the blades 26 on its support arm in the desired orientation as shown in FIG. 1.

FIGS. 7 and 8 illustrate a blade unit 126 mounted on the outer end of one of the support arms 25. Blade unit 126 includes a resilient molded resin bladeholder 127 including a hub 138 that has the same configuration as the hub 38 on blade 26 (FIGS. 5 and 6). Bladeholder 127 is formed with a shelf 128 on which a cleaner or scraper blade 129 is supported. Blade 129 may be of urethane or other resin material. More frequently, however, blade unit 126 employs a blade 129 of harder material, such as metal or ceramic.

Blade unit 126 further includes a unitary resilient molded resin blade retention strip 131 that fits onto shelf 128 and engages one surface of blade 129. Retention strip 131 includes three projections 132 that extend through aligned openings in blade 129 and corresponding openings in the upper portion 133 of bladeholder 127. In assembling blade 129 in blade unit 126, the blade is aligned on shelf 128 with the openings through the blade aligned with those in portion 133 of bladeholder 127; projections 132 are then forced through the blade and through member 133 to the position shown in FIGS. 7 and 8. To assure firm retention of blade 129 in blade unit 126, the outer end of each projection 132 is enlarged as shown at 134, affording a pop-through fit for projections 132.

Once each blade 129 is assembled in its blade unit 126, the utilization of the resulting blade unit is the same as for the blades 26.

It will be apparent that some of the relationships between interfitting portions of the support arms 25 and anchors 32, and between the support arms and the blade units 26,126 can be modified without loss of the benefits of the invention. Thus, in the interconnection between each arm 25 and its anchor 32, the key elements 28 and 34 may be reversed, with the key on arm 25 and the keyway in anchor 32. A similar reversal may be effected at the outer end of the support arm as regards key elements 37 and 44. The circular cross-sectional shape for arms 25 is not essential; other shapes may be utilized.

I claim:

1. In a conveyor belt cleaner of the kind comprising an elongated mounting member extending in transverse spaced relation to a conveyor belt, a plurality of resilient blade support arms mounted at spaced longitudinal positions on the mounting member and projecting from the mounting member toward the conveyor belt, and a plurality of cleaner blade units mounted on the outer ends of the blade support arms, the improvement comprising:

a plurality of support arm anchors affixed to the mounting member at longitudinally spaced intervals, each anchor including a pin and a key element integral with and extending longitudinally of the pin;

a plurality of molded resilient resin blade support arms each having an inner end and an outer end, each end of each blade support arm including a key element, the inner end of each blade support arm having a predetermined configuration interfitting with the pin and key element of one of the anchors in a keyed interference fit to afford a firm but displaceable mounting of the support arm on the anchor in a predetermined fixed orientation relative to the mounting member;

and a plurality of molded resilient resin cleaner blade units, each unit including a mounting portion comprising a key element, the outer end of each blade support arm having a predetermined configuration interfitting with the mounting portion of one of the blade units in a keyed interference fit to afford a firm but displaceable mounting of the blade unit on the outer end of the support arm in a predetermined fixed orientation relative to the blade support arm.

2. A conveyor belt cleaner according to claim 1 in which each blade support arm includes a projection at its inner end which engages the mounting member at one or more points to assure maintenance of the aforesaid fixed orientation of the support arm relative to the mounting member.

3. A conveyor belt cleaner according to claim 1 in which:

the outer end of each blade support arm comprises a radially outwardly projecting flange adjacent to a radially inwardly extending groove; and the mounting portion of each cleaner blade unit comprises a socket including a radially outwardly extending outer groove, for receiving the flange on the blade support arm, adjacent to a radially inwardly projecting flange, for seating in the groove in the blade support arm.

4. A conveyor belt cleaner according to claim 3 in which the flanges and grooves in the outer ends of the blade support arms and in the mounting portions of the blade units are all of annular configuration.

5. A conveyor belt cleaner according to claim 5 in which each blade unit comprises:

a unitary, resilient molded resin bladeholder with a mounting portion socket molded integrally therein, the bladeholder having an integral blade support shelf and a wall projecting from that shelf for engaging one side of a cleaner blade positioned on the shelf;

and a unitary, resilient molded resin blade retention strip mountable on the bladeholder to engage the opposite side of the cleaner blade and thereby retain the cleaner blade on the shelf.

6. In a conveyor belt cleaner of the kind comprising an elongated mounting member extending in transverse spaced relation to a conveyor belt, a plurality of resilient blade support arms mounted at spaced longitudinal positions on the mounting member and projecting from the mounting member toward the conveyor belt, and a plurality of cleaner blade units mounted on the outer ends of the blade support arms, the improvement comprising:
  a plurality of support arm anchors affixed to the mounting member at longitudinally spaced intervals, each anchor including a key element comprising a pin and a key projecting from the pin;
  a plurality of molded resilient resin blade support arms each having an inner end and an outer end, each end of each blade support arm including a key element,
  the inner end of each blade support arm having a predetermined configuration, comprising an integrally molded socket and keyway interfitting with the pin and key of one of the anchors in a keyed interference fit to afford a firm but displaceable mounting of the support arm on the anchor in a predetermined fixed orientation relative to the mounting member;
  and a plurality of moded resilient resin cleaner blade units, each unit including a mounting portion comprising a key element,
  the outer end of each blade support arm having a predetermined configuration interfitting with the mounting portion of one of the blade units in a keyed interference fit to afford a firm but displaceable mounting of the blade unit on the outer end of the support arm in a predetermined fixed orientation relative to the blade support arm.

7. A conveyor belt cleaner according to claim 6 in which the anchor pin projects longitudinally of the mounting member and the key has a length substantially shorter than the length of the pin.

8. A conveyor belt cleaner according to claim 6 in which each blade support arm includes a projection at its inner end which engages the mounting member at one or more points to assure maintenance of the aforesaid fixed orientation of the support arm relative to the mounting member.

9. A conveyor belt cleaner according to claim 6 in which:
  the outer end of each blade support arm comprises a radially outwardly projecting flange adjacent to a radially inwardly extending groove; and
  the mounting portion of each cleaner blade unit comprises a socket including a radilly outwardly extending outer groove, for receiving the flange on the blade support arm, adjacent to a radially inwardly projecting flange, for seating in the groove in the blade support arm.

10. A conveyor belt cleaner according to claim 9 in which the anchor pin projects longitudinally of the mounting member and the key has a length substantially shorter than the length of the pin.

11. A conveyor belt cleaner according to claim 10 in which:
  the key element of the outer end of each blade support arm comprises a keyway extending radially inwardly of the flange on the outer end of the support arm; and
  the key element of the mounting portion of each blade unit comprising a key projecting radially inwardly of the outer groove in the blade unit socket for seating in the keyway in the outer end of the support arm.

12. A conveyor belt cleaner according to claim 11 in which the flanges and grooves in the outer ends of the blade support arms and in the mounting portions of the blade units are all of annular configuration; and
  the outer end of each blade support arm includes two keyways and the socket in each blade unit includes two keys.

13. In a conveyor belt cleaner of the kind comprising an elongated mounting member extending in transverse spaced relation to a conveyor belt, a plurality of resilient blade support arms mounted at spaced longitudinal positions on the mounting member and projecting from the mounting member toward the conveyor belt, and a plurality of cleaner blade units mounted on the outer ends of the blade support arms, the improvement comprising:
  a plurality of support arm anchors affixed to the mounting member at longitudinally spaced intervals, each anchor including a key element;
  a plurality of molded resilient resin blade support arms each having an inner end and an outer end, each end of each blade support arm including a key element,
  the inner end of each blade support arm having a predetermined configuration interfitting with one of the anchors in a keyed interference fit to afford a firm but displaceable mounting of the support arm on the anchor in a predetermined fixed orientation relative to the mounting member;
  and a plurality of molded resilient resin cleaner blade units, each unit including a mounting portion comprising a key element,
  the outer end of each blade support arm having a predetermined configuration interfitting with the mounting portion of one of the blade units in a keyed interference fit to afford a firm but displaceable mounting of the blade unit on the outer end of the support arm in a predetermined fixed orientation relative to the blade support arm;
  the outer end of each blade support arm comprising a radially outwardly projecting flange adjacent to a radially inwardly extending groove, and the key element of the outer end of each blade support arm comprising a keyway extending radially inwardly of the flange on the outer end of the support arm;
  the mounting portion of each cleaner blade unit comprising a socket including a radially outwardly extending outer groove, for receiving the flange on the blade support arm, adjacent to a radially inwardly projecting flange, for seating in the groove in the blade support arm, and the key element of the mounting portion of each blade unit comprising a key projecting radially inwardly of the outer groove in the blade unit socket for seating in the keyway in the outer end of the support arm.

14. A conveyor belt cleaner according to claim 13 in which the flanges and grooves in the outer ends of the blade support arms and in the mounting portions of the blade units are all of annular configuration; and the outer end of each blade support arm includes two keyways and the socket in each blade unit includes two keys.

15. A conveyor belt cleaner according to claim 13 in which each blade unit is a unitary, resilient molded blade with a mounting portion socket molded integrally therein.

16. A conveyor belt cleaner according to claim 15 in which:
   each anchor includes a pin and a key projecting from the pin; and
   the inner end of each blade support arm includes an integrally molded socket and keyway for receiving the pin and key of the anchor in a keyed interference fit.

17. In a conveyor belt cleaner of the kind comprising an elongated mounting member extending in transverse spaced relation to a conveyor belt, a plurality of resilient blade support arms mounted at spaced longitudinal positions on the mounting member and projecting from the mounting member toward the conveyor belt, and a plurality of cleaner blade units mounted on the outer ends of the blade support arms, the improvement comprising:
   a plurality of support arm anchors affixed to the mounting member at longitudinally spaced intervals, each anchor including a key element;
   a plurality of molded resilient resin blade support arms each having an inner end and an outer end, each end of each blade support arm including a key element,
   the inner end of each blade support arm having a predetermined configuration interfitting with one of the anchors in a keyed interference fit to afford a firm but displaceable mounting of the support arm on the anchor in a predetermined fixed orientation relative to the mounting member;
   the outer end of each blade support arm comprising radially outwardly projecting flange adjacent to a radially inwardly extending groove;
   and a plurality of molded resilient resin cleaner blade units, each blade unit comprising a unitary, resilient molded resin bladeholder with a mounting portion socket molded integrally therein, the bladeholder having an integral blade support shelf and a wall projecting from that shelf for engaging one side of a cleaner blade positioned on the shelf, and a unitary, resilient molded resin blade retention strip mountable on the blade holder to engage the opposite side of the cleaner blade and thereby retain the cleaner blade on the shelf;
   each cleaner blade including at least two apertures aligned with corresponding apertures in the bladeholder wall, and each blade retention strip including two integrally molded retention projections, aligned with and extending through the apertures in the blade and the bladeholder, each retention projection having an enlarged outer end larger than the mating aperture in the bladeholder to afford a pop-through fit;
   the mounting portion of each cleaner blade unit comprising a socket including a radially outwardly extending outer groove, for receiving the flange on the blade support arm, adjacent to a radially inwardly projecting flange, for seating in the groove in the blade support arm;
   the outer end of each blade support arm having a predetermined configuration interfitting with the mounting portion of one of the blade units in a keyed interference fit to afford a firm but displaceable mounting of the blade unit on the outer end of the support arm in a predetermined fixed orientation relative to the blade support arm.

18. A conveyor belt cleaner according to claim 17 in which:
   the key element of the outer end of each blade support arm comprises a keyway extending radially inwardly of the flange on the outer end of the support arm; and
   the key element of the mounting portion of each blade unit comprising a key projecting radially inwardly of the outer groove in the blade unit socket for seating in the keyway in the outer end of the support arm.

19. A conveyor belt cleaner according to claim 18 in which:
   each anchor includes a pin and a key projecting from the pin; and
   the inner end of each blade support arm includes an integrally molded socket and keyway for receiving the pin and key of the anchor in a keyed interference fit.

* * * * *